April 17, 1951 J. M. TYRNER 2,549,648
WELDING GENERATOR
Filed Feb. 17, 1948

INVENTOR
Joseph M. Tyrner
BY
Pennie Edmonds Morton & Barrows
ATTORNEYS

Patented Apr. 17, 1951

2,549,648

UNITED STATES PATENT OFFICE 2,549,648

WELDING GENERATOR

Joseph M. Tyrner, New York, N. Y., assignor to Air Reduction Company, Incorporated, a corporation of New York Application February 17, 1948, Serial No. 8,889

5 Claims. (Cl. 322—50)

This invention relates to direct current arc welding, and, more particularly, to direct current welding generators employing a series field winding for self-regulation.

A particular object of this invention is to provide a simplified construction and arrangement of parts for welding generators having the operating characteristics of the generators disclosed in Patent No. 2,291,008.

The generator construction disclosed in Patent 2,291,008 comprised a field magnet frame or yoke providing a magnetic circuit or path for leakage flux outside the armature, in addition to the usual magnetic circuit for working flux through the armature, the yoke being constructed to provide a saturated portion common to each of the two magnetic circuits. An essential feature of this construction was the use of a main field winding interlinked with this common portion of the two magnetic circuits. In other words, it was regarded as necessary to have some portion, in fact the major portion of the working flux producing coils interlinked with this common, saturated portion of the two magnetic circuits.

The present invention is based on the discovery that a direct current welding generator of greatly simplified and improved construction, but having fundamentally the same operating characteristics as the construction disclosed in Patent No. 2,291,008, can be provided by mounting the field coils so that they are interlinked with only those portions of the magnetic circuits other than the portion thereof common to both circuits. Thus according to the present invention neither the series field winding nor the main field winding is interlinked with the common portion of the two magnetic circuits. Furthermore, it is not necessary to have the common portion of the main and auxiliary magnetic circuits of such restricted cross-section as to be magnetically fully saturated under all operating conditions, as in the generators of Patent No. 2,291,008.

A typical embodiment of the present invention is illustrated in the accompanying drawings, in which.

Figure 1:
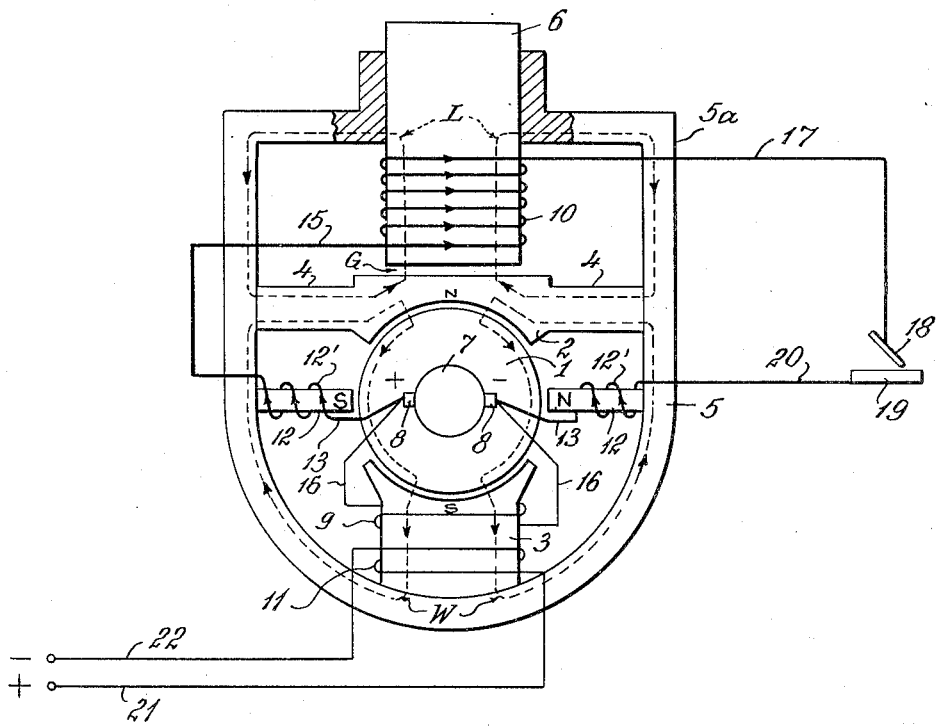
Fig. 1 is a diagrammatic illustration of a direct current welding generator constructed in accordance with my invention.

The generator illustrated in Fig. 1 comprises a two-pole armature 1 of conventional type adapted to rotate between opposite poles 2 and 3. The pole 2 is supported by side supporting cores 4 from the outer yoke 5 of the magnet frame. This frame includes a yoke extension $5a$ magnetically cooperating with the pole 2 through a regulating core 6 adapted to be moved inwardly and outwardly to vary the air gap G formed between the regulating core and the pole 2. The pole 3 may be of the usual salient pole construction carried by the yoke 5 which completes the main field magnetic circuit including the pole 3, yoke 5, cores 4 and pole 2, the working flux W returning to the pole 3 through the armature 1. The auxiliary or leakage flux magnetic circuit includes the pole 2, cores 4, yoke extension $5a$ and regulating core 6, the leakage flux L passing across the adjustable air gap G between the pole 2 and the core 6. The main field magnetic circuit and the auxiliary magnetic circuit thus have a portion in common, i. e., the cores 4 and portions of the pole 2 being common to both of these magnetic circuits by virtue of the fact that they carry both leakage flux and working flux.

The armature is equipped with the usual commutator 7 cooperating with brushes 8. The generator may be provided with the usual interpoles 12 carrying series interpole windings 12'. A series or auxiliary field winding 10 is suitably mounted to embrace or interlink with the regulating core 6. The circuit for the series winding 10 associated with the movable regulating core 6 extends from the positive brush 8 through conductor 13, interpole winding 12', conductor 15, winding 10, load conductor 17, welding electrode 18, work piece 19, conductor 20, interpole winding 12' and conductor 13 to the negative brush 8.

The main field winding, which produces the working flux W passing through the armature 1, is, according to the present invention interlinked only with some portion or portions of the main magnetic circuit other than that portion thereof that is also a part of or common to the auxiliary or leakage flux magnetic circuit, this common portion consisting of the cores 4 and the portions of the pole 2 carrying both working flux and leakage flux. Thus in Fig. 1 I have shown a shunt field coil 9 on the salient pole 3, this coil being connected to the brushes 8 by leads 16. This pole 3 also carries a separately excited field coil 11 connected to a source of excitation current through leads 21 and 22. These main field coils 9 and 11 form the main field winding and produce the working flux W in the main magnetic circuit including the S pole 3, the yoke 5, cores 4 and the N pole 2, the working flux returning to the pole 3 through the armature 1. The coils 9 and 11 are shown as surrounding or interlinking with the salient pole 3 but it will be understood that they would produce the desired magnetizing effect if they interlinked any other portion of the main magnetic circuit except the portion carrying both working flux and leakage flux. Thus one or both of the main field coils could be mounted on an extension of the pole 2 opposite the armature, because this portion of pole 2 carries only working flux passing through the armature and the pole face.

The main field coils 9 and 11 are so wound or connected with respect to the direction of winding or connection of the series coil 10, that the leakage flux opposes the production of working flux in the main magnetic circuit. In each core 4 the leakage flux and working flux have the same direction, as indicated by the arrows on the flux lines L and W, and the condition for maximum working flux and maximum voltage output is the open circuit condition when no flux is produced by the series coil 10. After the welding circuit is closed, the load current flowing through the series coil 10 produces a flux in the auxiliary circuit, this flux depending upon the magnitude of the load current and the adjustment of the regulating core 6 which determines the length of the air gap G and therefore the reluctance of the auxiliary magnetic circuit. Since the working flux W and the auxiliary flux L both pass in the same direction through the common magnetic path including the cores 4 and portions of the pole 2, the M. M. F. created by the main field coils 9 and 11 is opposed by the magnetic potential drop due to the passage of leakage flux L and working flux W through cores 4. This limits the value of the working flux W. The working flux and generated voltage reach a minimum value when the load circuit is short circuited. For any given setting of the regulating core 6 and welded resistance value, a stable flux distribution between the auxiliary circuit and the armature circuit is attained, producing a stable welding voltage.

Figure 3:
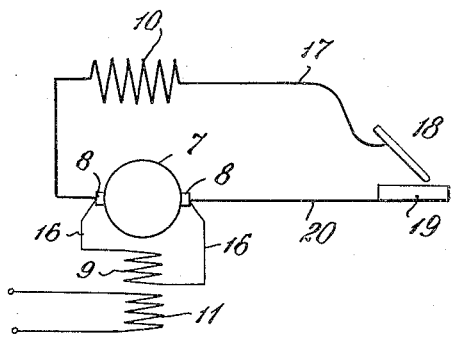
Fig. 3 is an electrical circuit diagram showing the generator connected to a welding circuit.

The electrical circuit of the generator is best illustrated in Fig. 3 which shows the series field winding 10 connected to the commutator brushes 8 in series with the load circuit including the load conductors 17 and 20, the welding electrode 18 and the workpiece 19. The shunt field coil 9 is connected across the brushes 8 and the separately excited field coil 11 is connected to an external source of excitation current.

Figure 2:
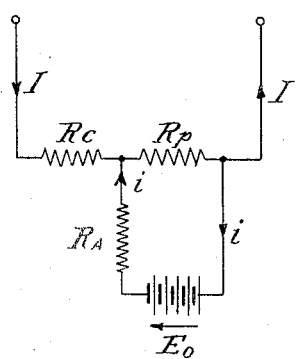
Fig. 2 is an equivalent electric circuit representing conditions corresponding with those in the magnetic circuits of the generator of Fig. 1.

The magnetic circuit of the machine can be considered as replaced by an equivalent electrical circuit as illustrated in Fig. 2 wherein magnetic fluxes are replaced by currents, magnetomotive forces (M. M. F.) by voltages, and reluctances by resistances. Thus the equivalent of the main magnetic circuit is the circuit of the voltage $E_0$ and the currents through the resistances $R_A$ and $R_p$, $R_A$ being the resistance equivalent of the reluctance of that portion of the main magnetic circuit other than the portion common to the two magnetic circuits, and $R_p$ being the resistance equivalent of the reluctance of the common portion of these two magnetic circuits. The current $I$ through the resistances $R_c$ and $R_p$ represents the auxiliary or leakage magnetic circuit wherein $I$ is the current equivalent of the leakage flux L, $R_c$, the resistance equivalent of the reluctance of that portion of the leakage circuit other than the portion common to the two magnetic circuits, and $R_p$ is the resistance equivalent of the reluctance of the common portion of the two magnetic circuits as stated above. The sum of the voltages or potential differences around the closed circuit must be zero, and, accordingly $$E_0 - iR_A - (I+i)R_p = 0$$

$$i = \frac{E_0 - IR_p}{R_A + R_p}$$

It is apparent from the above equations that when $E_0 = IR_p$, $i$ is equal to zero. Thus the current $i$ depends on the value of the current $I$ and accordingly, considered in terms of the magnetic circuits of the generator, the generated voltage becomes zero for a certain value of leakage flux L in the auxiliary magnetic circuit. This leakage flux depends on the length of the air gap G and accordingly the generator output may be controlled by varying this air gap. For any given setting of the regulating core 6 it will be understood that on open circuit there is no leakage flux generated in the auxiliary magnetic circuit and the flux density of the working flux W in the armature circuit is a maximum providing maximum voltage output. As current flows in the load circuit and therefore in the series winding 10, flux is created in the auxiliary magnetic circuit and this reduces the working flux produced in the main magnetic circuit including the generator armature. The current-voltage relation for a generator of this construction is approximately linear, with the slope varying according to the air gap in the auxiliary magnetic circuit. With the generator on short circuit, a balance point is reached where the majority of the flux is in the auxiliary magnetic circuit, resulting in a very small voltage at the brushes.

As stated above, the welding generator of the present invention has the same operating characteristics as the construction disclosed in Patent 2,291,008. As compared with the present invention, the generators disclosed in Patent 2,291,008 are difficult to construct because of the limited space in which to place the necessary windings on the portion of the core that is common to both magnetic circuits. The generator of the present invention is relatively simple to wind since no coil is required on the bridge or common portion of the magnetic circuit which carries both leakage flux produced in the auxiliary magnetic circuit and working flux produced in the main magnetic circuit.

It will be understood that this invention is not limited to the specific embodiment thereof illustrated in the accompanying drawings and described in detail but includes such modifications thereof as fall within the scope of the appended claims.

I claim:

1. A direct current welding generator comprising an armature, a main magnetic structure cooperating with said armature to form a main magnetic circuit for magnetic working flux including a yoke and at least two pole pieces, an auxiliary magnetic structure forming an auxiliary magnetic circuit for auxiliary leakage flux comprising a yoke extension connected to the yoke, said auxiliary magnetic circuit having a portion thereof in common with the main magnetic circuit, said portion carrying both the auxiliary leakage flux and the working flux, the sum of said fluxes being insufficient to saturate said common portion under normal operating conditions, a main field winding about a portion of the main magnetic circuit other than said common portion for producing substantially all of the working flux, and an auxiliary winding about a portion of said yoke extension other than the common portion for producing flux in the common portion opposing the production of working flux by the main field winding.

2. A direct current welding generator comprising an armature, a main magnetic structure cooperating with said armature to form a main magnetic circuit for magnetic working flux including a yoke, a first pole piece supported by said yoke and a second pole piece located opposite the first pole piece and connected to the yoke, the armature being disposed between said first and second pole pieces, an auxiliary magnetic structure forming an auxiliary magnetic circuit for auxiliary leakage flux comprising a yoke extension connected to the yoke and a regulating core member supported by the yoke extension, said auxiliary magnetic circuit having a portion thereof in common with the main magnetic circuit for carrying both the auxiliary leakage flux and the working flux, the sum of said fluxes being insufficient to saturate said common portion under normal operating conditions, a main field winding about a portion of the main magnetic circuit other than said common portion for producing substantially all of the working flux, and an auxiliary winding about said regulating core member for producing a flux in said common portion opposing the production of the working flux by the main field winding, said regulating core member being positioned adjacent said common portion and movable toward and away from the common portion, whereby the magnetic reluctance of the auxiliary magnetic circuit may be adjusted.

3. A direct current welding generator comprising an armature, a main magnetic core structure cooperating with said armature comprising a yoke and two diametrically opposed pole pieces, a main field winding wound about at least one of said pole pieces to produce working flux in said main magnetic core structure, an auxiliary magnetic core structure comprising a yoke extension connected to said yoke and a regulating core member supported by said yoke extension, said auxiliary magnetic core structure having a portion thereof in common with the main magnetic core structure, and an auxiliary winding wound about a portion of said auxiliary magnetic core structure other than said common portion, said auxiliary winding being in series circuit relation with the armature and wound to generate a flux in the auxiliary magnetic structure with a polarity such that the flux lines produced thereby in the common portion of the main and auxiliary core structures are in the same direction as the flux lines produced in said common portion by the main field winding, said common portion having a cross-sectional area greater than the cross-sectional area at which it would be magnetically saturated by the largest total flux produced therein by the auxiliary and main field windings under normal operating conditions, said regulating core member being positioned adjacent said common portion and movable toward and away from the common portion to form an adjustable air gap in the auxiliary magnetic circuit.

4. A direct current welding generator comprising an armature, a field magnet structure including a yoke, a first pole piece supported by said yoke, a second pole piece located opposite the first pole piece and supporting core members connecting the second pole piece with said yoke, the armature being disposed between said first and second pole pieces, a yoke extension carried by the yoke, a regulating core member supported by said yoke extension for movement toward and away from said second pole, said second pole and its supporting core members forming a common portion of a main magnetic circuit including the yoke and said first pole piece, and of an auxiliary magnetic circuit including the regulating core member and the yoke extension, said common portion carrying both the working flux and the auxiliary leakage flux and being unsaturated thereby under normal operating conditions, a main field winding on a portion of the main magnetic circuit other than said common portion producing substantially all of the working flux, and an auxiliary winding on a portion of said auxiliary magnetic circuit other than said common portion, said auxiliary winding producing a flux in said common portion opposing the production of the working flux by the main field winding, said main field winding comprising a winding connected in shunt with the armature and a separately excited winding, both wound about at least one of said first and second pole pieces.

5. A direct current welding generator comprising an armature, a main magnetic core structure cooperating with said armature comprising a yoke and two diametrically opposed pole pieces, a main field winding wound about at least one of said pole pieces to produce working flux in said main magnetic core structure, an auxiliary magnetic core structure comprising supporting core members connecting a first one of said pole pieces to said yoke, a yoke extension and a regulating core member supported by said yoke extension for movement toward and away from said first pole piece to form an adjustable air gap in the auxiliary magnetic circuit, said supporting core members and said first pole comprising a common portion of the main and the auxiliary magnetic core structures, and an auxiliary winding wound about said regulating core member, said auxiliary winding being in series circuit relation with the armature and wound to generate a flux in the auxiliary magnetic structure with a polarity such that the flux lines produced thereby in the common portion of the main and auxiliary core structures are in the same direction as the flux lines produced in said common portion by the main field winding, said common portion having a cross-sectional area greater than the cross-sectional area at which it would be magnetically saturated by the largest total flux produced therein by the auxiliary and main field windings under normal operating conditions.

JOSEPH M. TYRNER.

REFERENCES CITED

The following references are of record in the file of this patent:

UNITED STATES PATENTS

| Number | Name | Date |
|---|---|---|
| 396,602 | Rice | Jan. 22, 1889 |
| 2,291,008 | Tyrner | July 28, 1942 |